(12) United States Patent
Takanezawa

(10) Patent No.: US 8,302,142 B2
(45) Date of Patent: Oct. 30, 2012

(54) NETWORK CAMERA APPARATUS AND DISTRIBUTING METHOD OF VIDEO FRAMES

(75) Inventor: Tetsuhiro Takanezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 12/961,549

(22) Filed: Dec. 7, 2010

(65) Prior Publication Data

US 2011/0074962 A1   Mar. 31, 2011

Related U.S. Application Data

(62) Division of application No. 11/428,952, filed on Jul. 6, 2006, now Pat. No. 7,877,777.

(30) Foreign Application Priority Data

Jun. 23, 2006 (JP) ................................. 2006-173623

(51) Int. Cl.
*H04N 7/173* (2011.01)
(52) U.S. Cl. ..................................... 725/105; 348/211.3
(58) Field of Classification Search ............... 348/211.3; 725/105, 94, 96
See application file for complete search history.

(56) References Cited

U.S. PATENT DOCUMENTS

| 4,097,893 | A | 6/1978 | Camras |
| 6,097,435 | A | 8/2000 | Stanger et al. |
| 6,201,896 | B1 | 3/2001 | Ishikawa |
| 6,507,592 | B1 | 1/2003 | Hurvig et al. |
| 6,643,330 | B1 | 11/2003 | Nakagawa et al. |
| 6,698,021 | B1 | 2/2004 | Amini et al. |
| 6,775,654 | B1 | 8/2004 | Yokoyama et al. |
| 7,386,872 | B2 | 6/2008 | Shimizu |
| 2002/0031125 | A1 | 3/2002 | Sato |
| 2002/0174442 | A1 | 11/2002 | Nomura |
| 2003/0007785 | A1 | 1/2003 | Shimizu |
| 2003/0112335 | A1 | 6/2003 | Strandwitz et al. |
| 2003/0147633 | A1 | 8/2003 | Mikawa |
| 2004/0239763 | A1 | 12/2004 | Notea et al. |
| 2004/0252224 | A1 | 12/2004 | Shiraishi et al. |
| 2005/0021821 | A1* | 1/2005 | Turnbull et al. ............... 709/232 |
| 2005/0046611 | A1 | 3/2005 | Safran et al. |

(Continued)

FOREIGN PATENT DOCUMENTS

JP     11-205781 A    7/1999

(Continued)

*Primary Examiner* — Jason Chan
*Assistant Examiner* — Gary C Vieaux
(74) *Attorney, Agent, or Firm* — Fitzpatrick, Cella, Harper & Scinto

(57) ABSTRACT

When a request for a transmitting method of video frames of the client apparatus is received in a communicating unit to communicate with said client apparatus, whether the received request for the transmitting method of the video frames is a request for the transmitting method of the video frames for recording or a request for the transmitting method of the video frames for a live display is discriminated. If the received request for the transmitting method of the video frames is the request for the transmitting method of the video frames for recording, each of the video frames formed in an image sensing unit is temporarily stored in a memory and each of the stored video frames is transmitted. If the received request for the transmitting method of the video frames is the request for the transmitting method of the video frames for the live display, a process for transmitting the latest frame among the video frames formed in the image sensing unit is repetitively executed.

7 Claims, 9 Drawing Sheets

U.S. PATENT DOCUMENTS

| | | |
|---|---|---|
| 2006/0020710 A1 | 1/2006 | Rabenold et al. |
| 2006/0140221 A1 | 6/2006 | Yamada et al. |
| 2006/0279628 A1 | 12/2006 | Fleming |
| 2007/0223574 A1 | 9/2007 | Roman et al. |
| 2008/0037573 A1 * | 2/2008 | Cohen ............................ 370/412 |

FOREIGN PATENT DOCUMENTS

| | | |
|---|---|---|
| JP | 2002-077857 A | 3/2002 |
| JP | 2003-018525 A | 1/2003 |
| JP | 2003-219397 A | 7/2003 |
| JP | 2003-324710 A | 11/2003 |

* cited by examiner

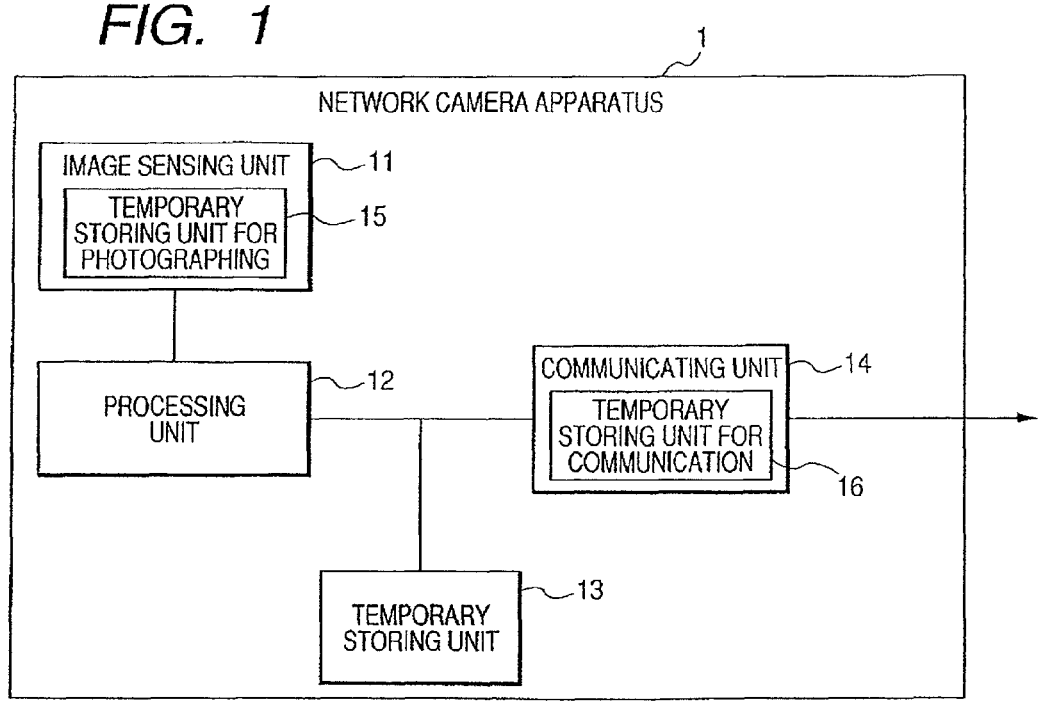
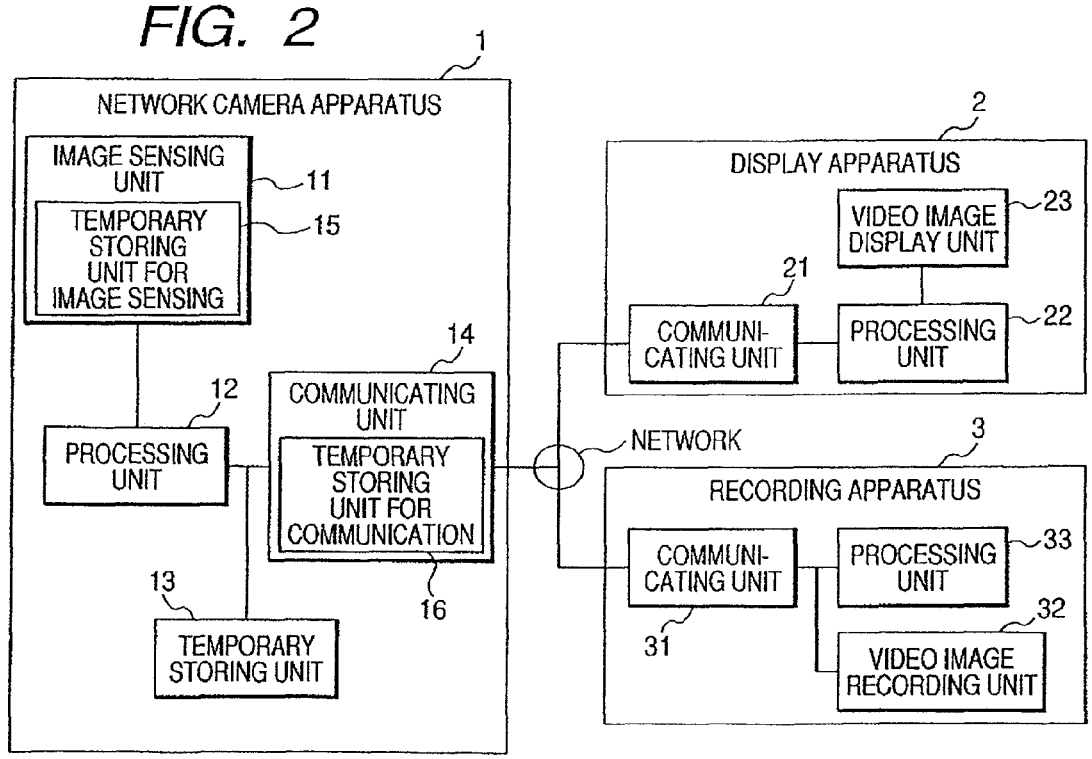

NETWORK CAMERA APPARATUS AND DISTRIBUTING METHOD OF VIDEO FRAMES

This application is a division of application Ser. No. 11/428,952 filed Jul, 6, 2006.

BACKGROUND OF THE INVENTION

1. Field of the Invention

The invention relates to a technique for transmitting video frames photographed by a camera through a network.

2. Related Background Art

A technique for displaying live video images outputted from a camera through a network and storing them into a storing apparatus such as an HDD or the like exists. For example, there is JP-A-H11-205781.

In the case of transmitting and receiving data in the network whose band is variable, a random delay due to a unique fluctuation or vergence due to the concentration of accesses occurs.

That is, according to the related background art, there are such problems that it takes a time which is required from the image sensing unit to the display and video frames to be recorded are dropped out.

SUMMARY OF THE INVENTION

It is an object of the invention to solve the above problem.

To accomplish at least one of the foregoing objects, according to an embodiment of the invention, there is provided a network camera apparatus for transmitting video frames formed in an image sensing unit to a client apparatus, comprising:

a communicating unit adapted to communicate with the client apparatus;

a memory for temporarily storing the video frames; and a control unit adapted to, when a request for a transmitting method of the video frames of the client apparatus is received in the communicating unit, discriminate whether the received request for the transmitting method of the video frames is a request for the transmitting method of the video frames for recording or a request for the transmitting method of the video frames for a live display, wherein if the received request for the transmitting method of the video frames is the request for the transmitting method of the video frames for recording, the control unit executes processes for temporarily storing each of the video frames formed in the image sensing unit into the memory and transmitting each of the stored video frames, and if the received request for the transmitting method of the video frames is the request for the transmitting method of the video frames for the live display, the control unit repetitively executes a process for transmitting the latest frame among the video frames formed in the image sensing unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a constructional diagram of a network camera apparatus;

FIG. 2 is a whole constructional diagram of a network camera system;

DETAILED DESCRIPTION OF THE PREFERRED EMBODIMENTS

Figure 3:
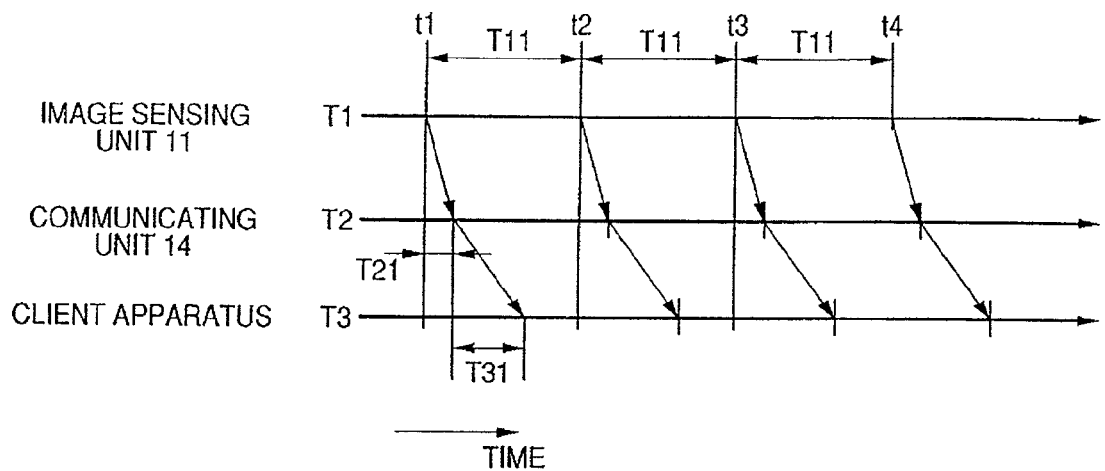
FIG. 3 is an example of a timing chart showing the time of a video frame which is transmitted from a network camera apparatus 1.

An embodiment of the invention will be described hereinbelow.

(First Embodiment)

A preferred embodiment to which the invention is applied will be described in detail hereinbelow with reference to the drawings.

FIG. 1 is a constructional diagram of a network camera apparatus. In FIG. 1, a network camera apparatus 1 transmits photographed video images to a network. An image sensing unit 11 photographs an object and outputs video frames.

A temporary storing unit 15 for sensing images temporarily stores the video frames upon execution of a process in the image sensing unit 11. A processing unit 12 controls the whole network camera apparatus. A temporary storing unit 13 temporarily stores the photographed video frames. A communicating unit 14 controls communication with a client apparatus. A temporary storing unit 16 for communication temporarily stores the video frames upon execution of a process in the communicating unit 14.

The image sensing unit 11 has: an image pickup device such as a CCD or the like; an image processing circuit for A/D converting an image signal from the image pickup device and executing a chrominance signal process, a compressing process, and the like; and a control circuit for controlling the image sensing unit 11. The image sensing unit 11 adds information indicative of an image sensing time to the video frames obtained by the image processing circuit.

The temporary storing unit 15 for image sensing is constructed by a volatile memory such as a semiconductor memory or the like for temporarily recording the video frames in the image sensing process in the image sensing unit 11.

The processing unit 12 has: a ROM in which programs have been stored; a RAM for temporarily storing the program read out of the ROM; and a control unit (CPU) for controlling the whole network camera apparatus 1 on the basis of the program which has temporarily been stored in the RAM.

The temporary storing unit 13 is constructed by a hard disk or a non-volatile memory such as a flash memory or the like in order to store the video frames. The temporary storing unit 16 for the communication is constructed by a volatile memory such as a semiconductor memory or the like for temporarily storing the video frames which are transmitted from the communicating unit 14 or a request received from the client apparatus. The memories constructing the temporary storing units 13 and 16 may be a physically integrated memory.

The communicating unit 14 is a communicating circuit for transmitting the video frame and receiving the request from the client apparatus. When the communicating unit 14 has outputted the request received from the client apparatus to the processing unit 12, it deletes the request stored in the temporary storing unit 16 for the communication.

The network camera apparatus 1 has the transmitting method of the video frames for the live display and the transmitting method of the video frames for recording. The "live display" denotes that in the client apparatus, the video frames which were formed in the image sensing unit 11 of the network camera apparatus 1 and have been distributed from the communicating unit 14 are displayed in a real-time manner.

FIG. 2 is a whole constructional diagram of a network camera system in the embodiment. In FIG. 2, since a construction of the network camera apparatus 1 is similar to that in FIG. 1, its explanation is omitted here. Each of a display apparatus 2 and a recording apparatus 3 functions as a client apparatus. The display apparatus 2 and the recording apparatus 3 can communicate with the network camera apparatus 1 through a network such as Internet or the like.

The display apparatus 2 has a communicating unit 21, a processing unit 22, and a video image display unit 23.

The communicating unit 21 is a circuit for transmitting and receiving information to/from the network camera apparatus 1 or the like through the network. For example, the communicating unit 21 transmits a request for transmitting the video frames for the live display or the request for a frame rate to the network camera apparatus 1. This request further includes address of network apparatus and client apparatus. The processing unit 22 has: a ROM in which programs have been stored; a RAM for temporarily storing the program read out of the ROM; and a CPU for controlling the whole display apparatus 2 on the basis of the program which has temporarily been stored in the RAM. The video image display unit 23 is constructed by a display device such as an LCD or the like and displays video images on the basis of the video frames distributed from the network camera apparatus 1.

A recording apparatus 3 has a communicating unit 31, a video image recording unit 32, and a processing unit 33.

The communicating unit 31 is a circuit for transmitting and receiving information to/from the network camera apparatus 1 or the like through the network. For example, the communicating unit 31 transmits the request for transmitting the video frames for the live display or the request for the frame rate to the network camera apparatus. The video image recording unit 32 has a non-volatile recording medium having a large capacity such as a hard disk drive (HDD) or the like. The processing unit 33 has: a ROM in which programs have been stored; a RAM for temporarily storing the program read out of the ROM; and a CPU for controlling the whole recording apparatus 3 on the basis of the program which has temporarily been stored in the RAM.

Figure 6:
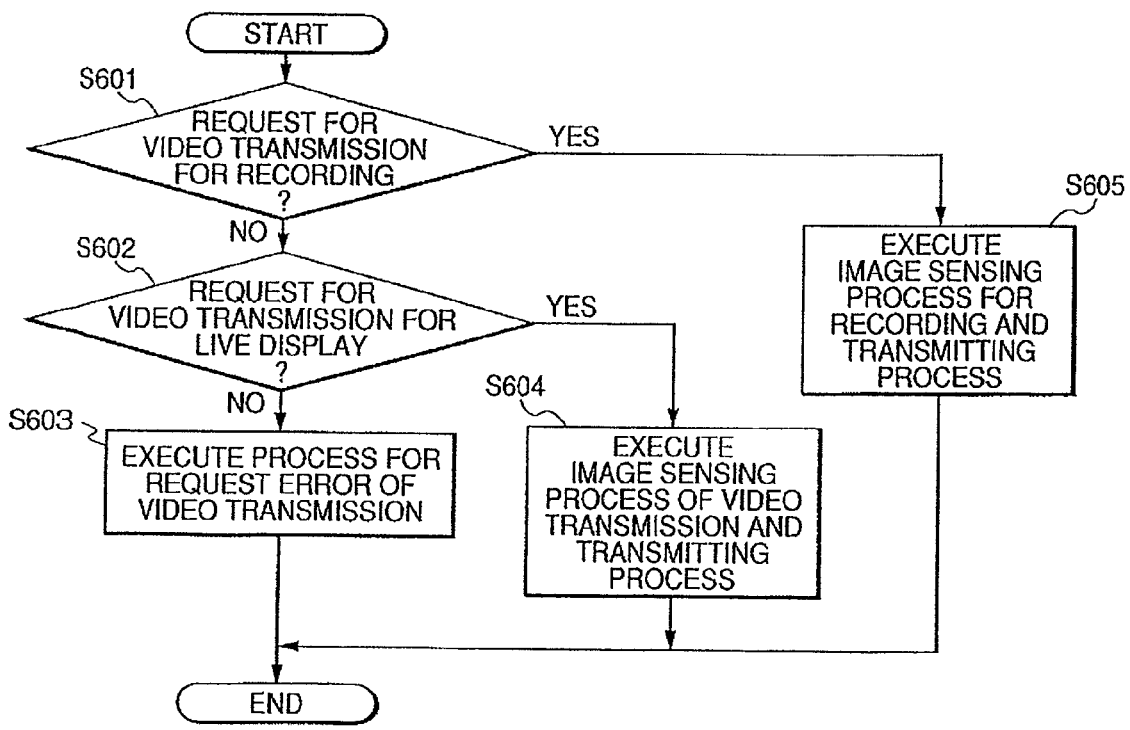
FIG. 6 is a flowchart showing a selecting process of a transmitting method of the video frame which is executed by a processing unit 12.

FIG. 6 is a flowchart regarding a selecting process of the transmitting method which is executed by the processing unit 12.

The processing unit 12 analyzes the request from the client apparatus which has been received by the communicating unit 14. As a result of the analysis, if it is determined that the request is the request for transmitting the video frames for recording (YES in step S601), the processing unit 12 allows the image sensing unit 11 to execute an image sensing process for recording and starts the execution of the transmitting process of the video frames for recording (S605).

If it is determined that the request is not the request for transmitting the video frames for recording (NO in step S601), the processing unit 12 discriminates whether or not the request is the request for transmitting the video frames for the live display (S602).

If it is determined that the request is the request for transmitting the video frames for the live display (YES in step S602), the processing unit 12 allows the image sensing unit 11 to execute an image sensing process for the live display and executes the transmitting process of the video frames for the live display (S604).

If it is determined that the request is not the request for transmitting the video frames for the live display (NO in step S602), the processing unit 12 allows the communicating unit 14 to return an error signal in response to the request (S603).

Figure 4:
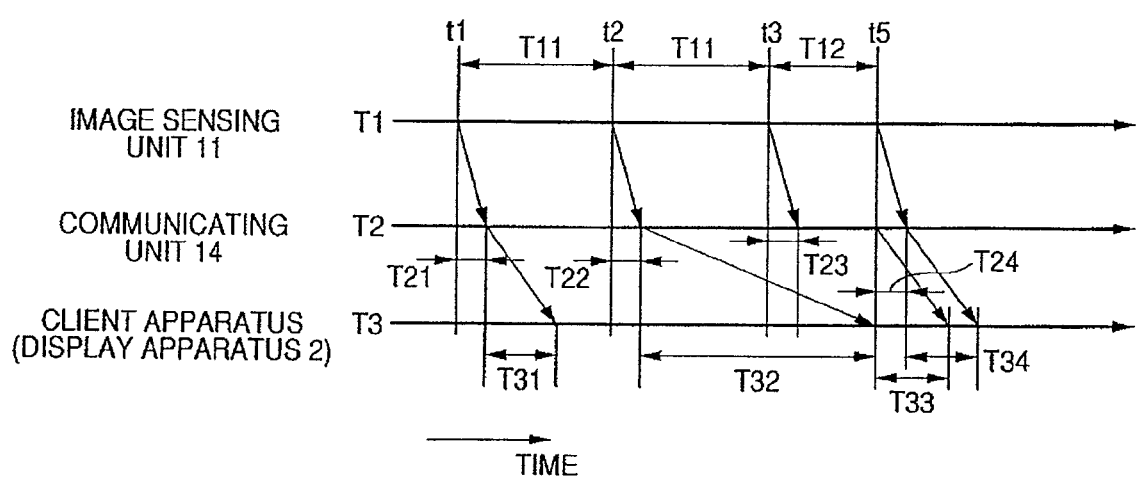
FIG. 4 is an example of a timing chart showing the time of the video frame which is transmitted from the network camera apparatus 1.
Figure 5:
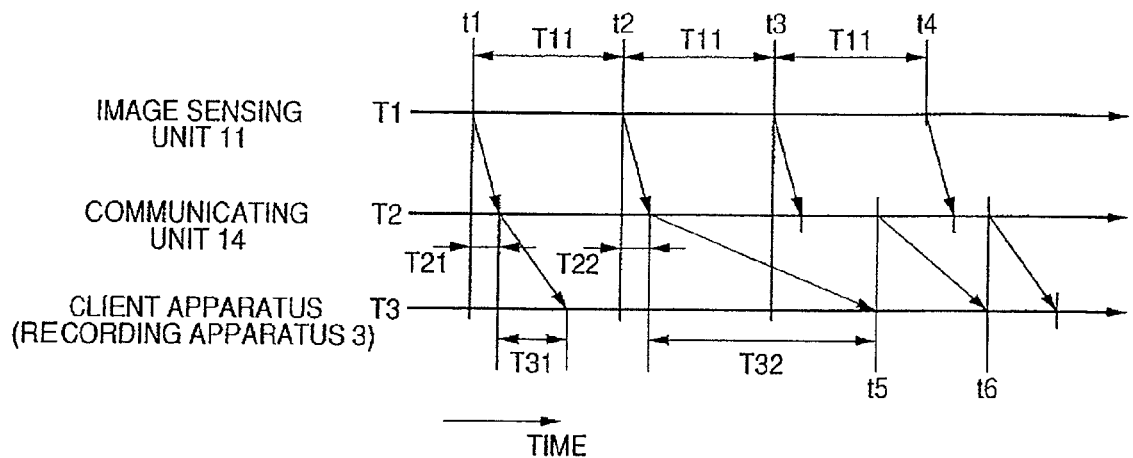
FIG. 5 is an example of a timing chart showing the time of the video frame which is transmitted from the network camera apparatus 1.

FIGS. 3, 4 and 5 are timing charts showing the time of the video frame which is transmitted from the network camera apparatus 1.

In FIGS. 3, 4 and 5, T1 denotes time when the video frame is formed on the basis of an image signal obtained by sensing images of an object. Although the image sensing time of the image pickup device of the image sensing unit 11 and the forming time when the video frame is formed actually slightly differ, explanation will be made hereinbelow on the assumption that they are equal. Furthermore, the explanation will be made on the assumption that an image sensing interval of the image sensing device in the image sensing unit and an interval of generating an video frame are equal.

T2 denotes time when the video frame has been transmitted to a client apparatus in the communicating unit 14. T3 denotes time when the client apparatus such as display apparatus 2, recording apparatus 3, or the like receives the video frame. T11 denotes a time interval between the video frames corresponding to the frame rate of the video frames which are transmitted from the network camera apparatus 1.

FIG. 3 shows the timing chart in the case where the video frame has been transmitted from the network camera apparatus 1 to the client apparatus without being delayed. FIG. 3 shows the timing chart in the video frame transmitting process for both of the live display and the recording.

In FIG. 3, the video frame formed in the image sensing unit 11 at time t1 is outputted to the communicating unit 14 by the process of the processing unit 12. The output of the video frame from the image sensing unit 11 to the communicating unit 14 is shown by an arrow from T1 to T2. A time required to output the video frame from the image sensing unit 11 to the communicating unit 14 is equal to T21.

The video frame formed in the image sensing unit 11 at time t1 is transmitted from the communicating unit 14 to the client apparatus. The transmission from the communicating unit 14 to the client apparatus is shown by an arrow from T2 to T3. A time required for the transmission to the client apparatus is equal to T31.

In the timing chart in the case where the video frame has been transmitted without being delayed. The sum of T21 and T31 is smaller than the time interval T11 of the video frame.

The video frame is formed in the image sensing unit 11 after the elapse of the time T11 from time t1 and processes similar to those mentioned above are repeated.

FIG. 4 shows the timing chart in the transmitting process of the video frame for the live display in the case where the transmission has been delayed by the vergence or the like of the network.

In FIG. 4, the transmission of the video frame formed at time t2 from the image sensing unit 11 to the communicating unit 14 is completed after the elapse of a time T22. The transmission of the video frame from the communicating unit 14 to the client apparatus is completed after the elapse of a time T32.

The time T32 which is required for the transmission of the video frame is longer than the time T31 due to the vergence or the like of the network. That is, the timing chart of FIG. 4 shows the case where the sum of T22 and T32 as a time when the transmission of the video frame from the image sensing unit 11 to the client apparatus is completed is larger than the forming interval T11 of the video frame. In the transmitting process of the video frame for the live display, the transmission of the next video frame is started in response to completion of the transmission of the previous video frame, if the transmission time for the previous video frame is longer than the forming interval for the next video frame.

The processing unit 12 transmits the video frame formed in the image sensing unit 11 at time t3 after the elapse of the time T11 from time t2 to the communicating unit 14. The communicating unit 14 transmits the previous video frame for a time interval from time t2 to time t5 after the elapse of (T11+T12). Therefore, the transfer of the video frame formed at time t3 to the client apparatus is started at time t5. With respect to the video frame formed at time t3, a time (T12−T23) during which the transmitting process is not executed exists until the video frame is transmitted to the client apparatus.

A time which is required to transmit the video frame formed in the image sensing unit 11 at time t5 from the image sensing unit 11 to the communicating unit 14 is time T24. A time which is required to transmit the video frame formed in the image sensing unit 11 at time t5 from the communicating unit 14 to the client apparatus is time T34. It is assumed that the time T24 and the time T34 are equal to those in the transmitting process of the video frame formed at time t3 (T23=T24, T33=T34), respectively. In this case, a time until the video frame is transmitted to the client apparatus after the object was photographed with respect to the video frame formed at time t5 is shorter than that of the video frame formed at time t3.

In the transmission for the live display, it is an object to reduce the time which is required until the video frame is transmitted to the client apparatus after the object was photographed. In the transmitting process of the video frame for the live display, if the time required for the transmitting process is longer than the forming interval of the video frames, processing unit 12 forces image sensing unit to generate new video frames 11 in response to completion of the transmission of the video frame to the client apparatus. Then, the video frames formed in the image sensing unit 11 is transmitted to the client. That is, in the timing chart of FIG. 4, the image sensing and transmission of the video frame are not executed at time t3 but the process for transmitting the video frame formed in the image sensing unit 11 at time t5 is executed.

FIG. 5 is a timing chart in the video frame transmitting process of the video frame for recording in the case where the transmission has been delayed due to the vergence or the like of the network.

In FIG. 5, the transmission of the video frame formed in the image sensing unit 11 at time t2 to the client apparatus has been delayed. The transmission completion time (T22+T32) of the video frame formed at time t2 to the client apparatus is longer than the forming interval T11 of the video frame.

In the transmitting process of the video frame for recording, real-time performance of the video frame is not important. In the transmitting process of the video frame for recording, the process is executed by giving a priority to the certain transmission of the formed video frame.

At time t3 in the timing chart of FIG. 5, the communicating unit 14 is in the state where the previous video frame (video frame formed at time t2) has been transmitted to the client apparatus. The transmission of the video frame formed at time t3 is started at time t5 when the transmission of the previous video frame has been completed.

Figure 7:
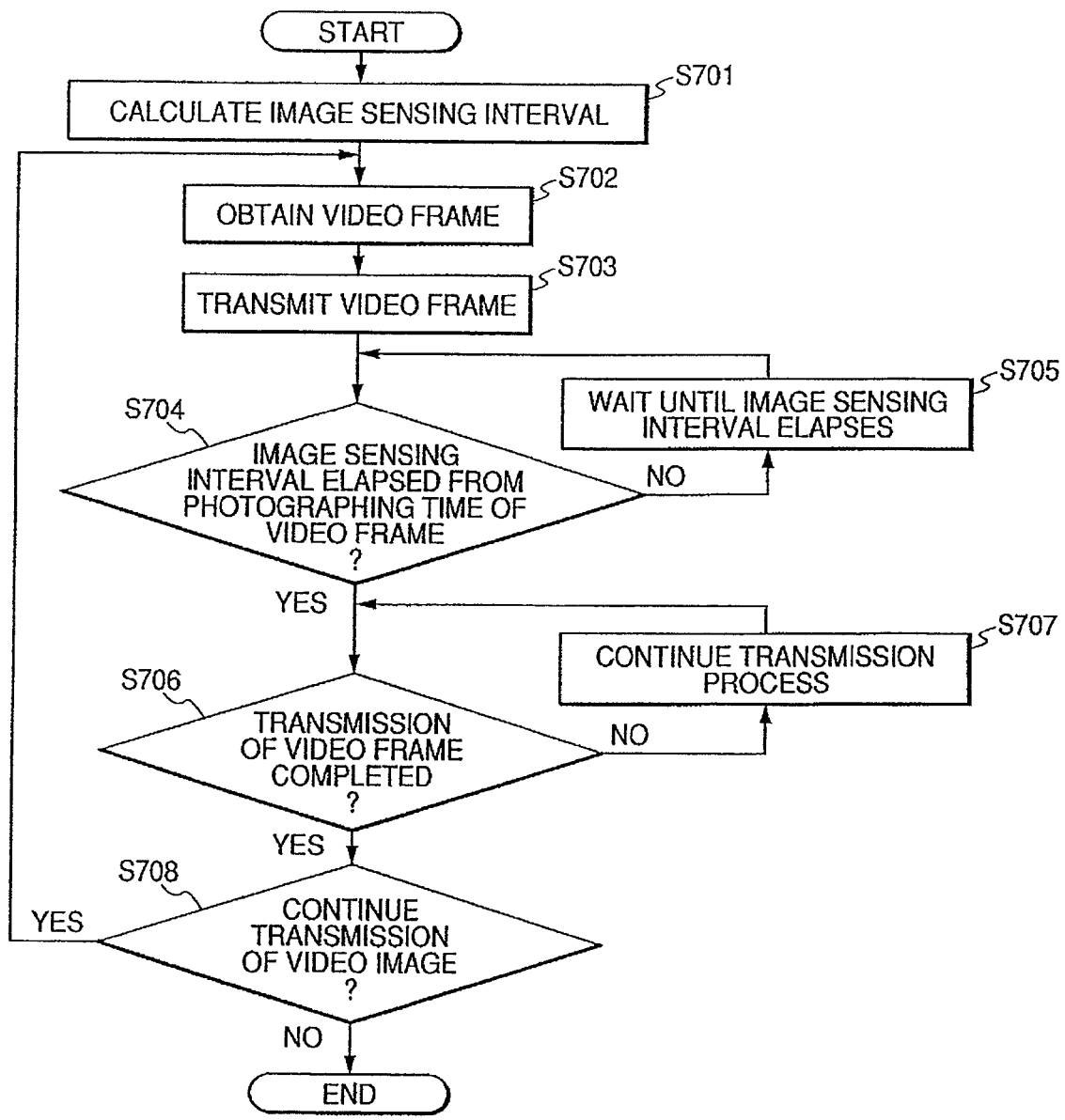
FIG. 7 is a flowchart for a forming/transmitting process of a video frame for a live display which is executed by the processing unit 12 in the first embodiment.

FIG. 7 is a flowchart showing the transmitting process of the video frame for the live display which is executed by the processing unit 12. In the transmitting process of the video frame for the live display, the latest video frame obtained from the image sensing unit 11 is transmitted.

The processing unit 12 decides a frame rate of the video frames which are formed in the image sensing unit 11 on the basis of the request for the video transmission from the client apparatus or a setting value of the network camera apparatus 1 which has been preset. In the process of FIG. 7, the client apparatus is display apparatus 2. An image sensing interval of the video frames corresponding to a value of the decided frame rate (frames/second) is calculated (S701).

The processing unit 12 allows the image sensing unit 11 to start the image sensing operation and form the video frames at calculated interval. The processing unit 12 obtains the latest one of the video frames stored in the temporary storing unit 15 for sensing images (S702). For example, as shown in FIG. 4, it is assumed that when the video frames formed at time t3 and time t5 exist in the temporary storing unit 15 for sensing images, the latest video frame indicates the video frame formed at time t5 between the two video frames.

The processing unit 12 outputs the video frame obtained from the image sensing unit 11 to the communicating unit 14 and allows it to be stored into the temporary storing unit 16 for the communication. The processing unit 12 allows the communicating unit 14 to transmit the video frame stored in the temporary storing unit 16 for the communication to the client apparatus as a transmitting source of the request (S703).

Subsequently, the processing unit 12 discriminates whether or not the time calculated in step S701 is the time when the previous video frame was formed in the image sensing unit 11 and the output was started (S704). If not (NO in S704), the processing unit 12 waits (S705).

If the image sensing interval has elapsed (YES in S704), the processing unit 12 discriminates whether or not the transmission of the video frame instructed to the communicating unit 14 in S703 has been completed (S706). If the communicating unit 14 does not complete the transmission of the video frame (NO in S706), the processing unit 12 forces the communicating unit 14 to continue the transmission of the video frame instructed in S703 (S707).

If the communicating unit 14 has completed the transmission of the video frame instructed in S703 (YES in S706), the processing unit 12 discriminates whether or not the transmission of the video frame is continued. The processing unit 12 discriminates the permission or inhibition of the continuation of the transmission of the video frame (S708) on the basis of whether or not the request for the termination of the transmission has been received from the client apparatus or on the basis of a communicating situation or the like of the client apparatus.

In the case of continuing the transmission of the video frame (YES in S708), the processing unit 12 repetitively executes the processes from S702. Namely, the processing unit 12 obtains the video frame from the image sensing unit 11 in the calculated image sensing interval if the transmission of the previous video frame has been completed within the interval, and obtains the video frame from the image sensing unit 11 upon completion of the transmission of the previous video frame so as to transmit the latest video frame if the transmission of the previous video frame is completed beyond the interval. If the transmission of the video image is not continued (NO in S708), the processing unit 12 finishes the control process of the image sensing for the video transmission and of the transmission.

Figure 8:
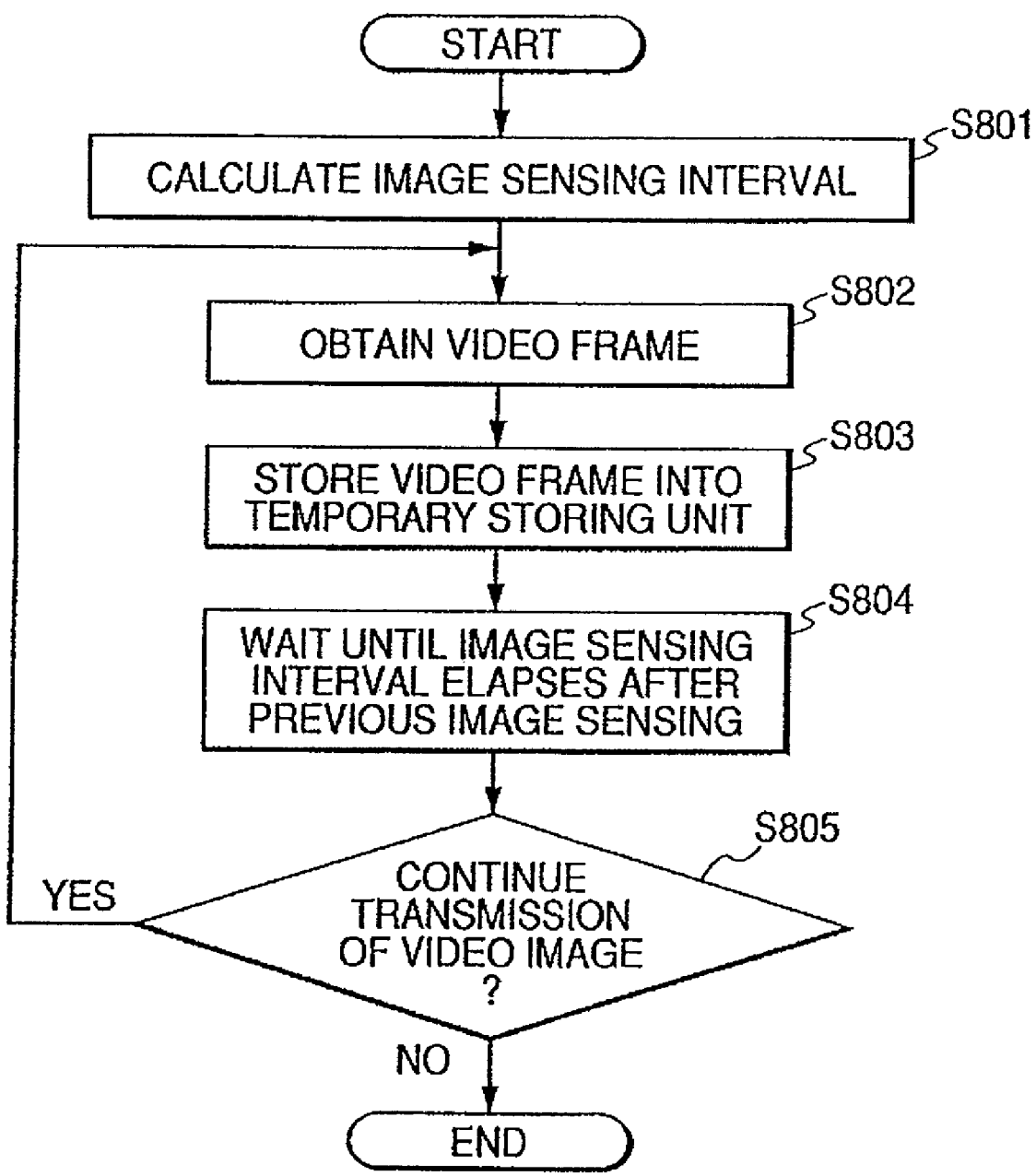
FIG. 8 is a flowchart for a forming process of a video frame for recording which is executed by the processing unit 12 in the first embodiment.
Figure 9:
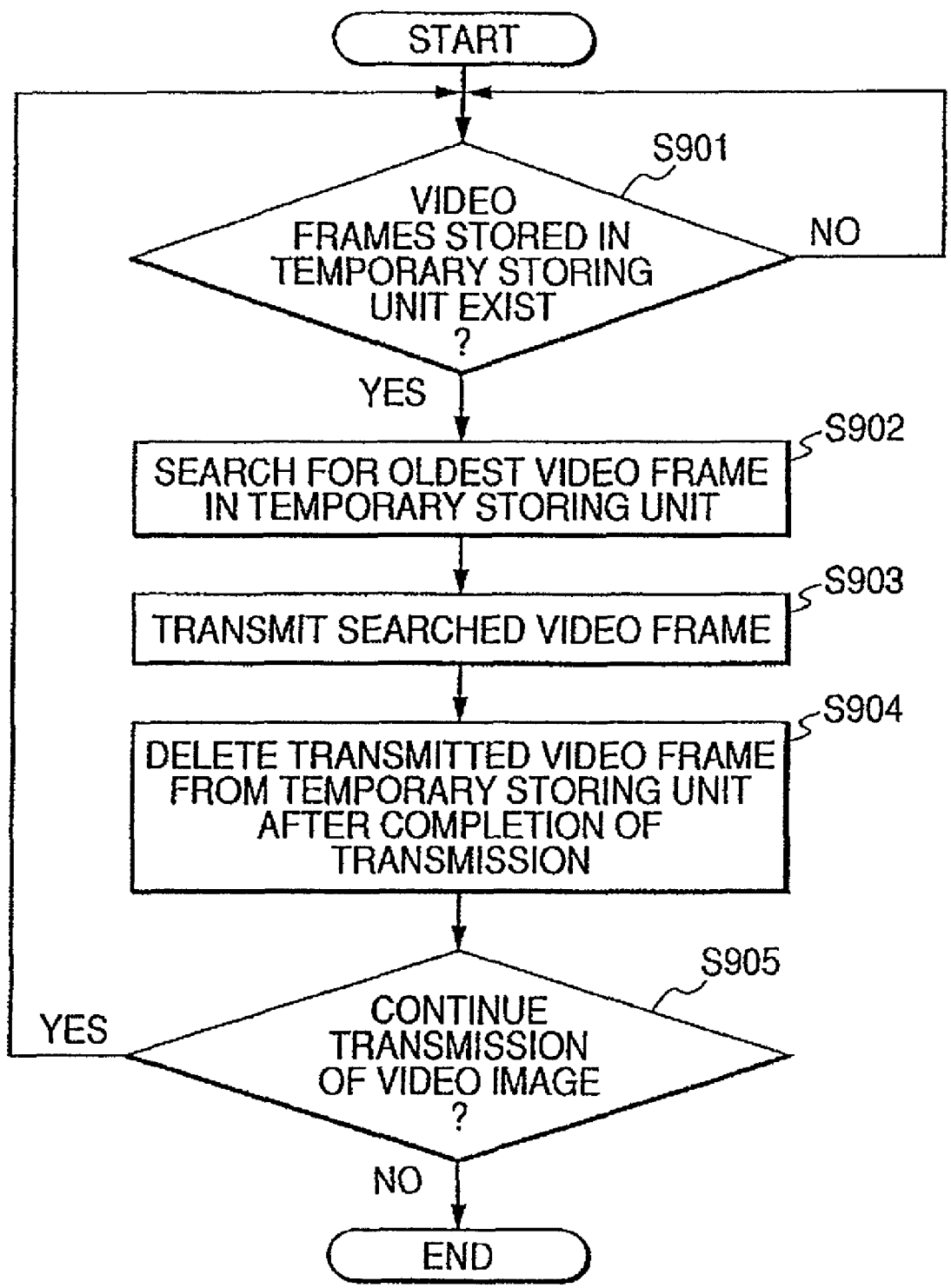
FIG. 9 is a flowchart for a transmitting process of the video frame for recording which is executed by the processing unit 12 in the first embodiment.

FIG. 8 is a flowchart for the forming process of the video frame for recording which is executed by the processing unit 12. FIG. 9 is a flowchart for the transmitting process of the video frame for recording which is executed by the processing unit 12. In the transmitting process of the video frame for recording, all the video frames obtained from the image sensing unit 11 are transmitted. The client apparatus in the processing of FIGS. 8 and 9 is the recording apparatus 3.

In FIG. 8, the processing unit 12 decides the frame rate of the video frames which are formed in the image sensing unit 11 on the basis of the request for the video transmission from the client apparatus or the setting value of the network camera apparatus 1 which has been preset. The processing unit 12 calculates the forming interval (image sensing interval) of the video frames corresponding to the value of the decided frame rate (S801).

The processing unit 12 allows the image sensing unit 11 to execute the forming process of the video frames. The processing unit 12 obtains the video frames stored in the temporary storing unit 15 for sensing images (S802). The processing unit 12 allows the video frames obtained from the image sensing unit 11 to be stored into the temporary storing unit 13 (S803).

The processing unit 12 waits for the execution of the next process until the image sensing interval calculated in S801 elapses from the time when the object has been photographed in just preceding step S802 (S804).

The processing unit 12 discriminates whether or not the transmission of the video image is continued (S805) on the basis of whether or not the request for the termination of the transmission has been received or on the basis of a communicating situation or the like of a client apparatus.

In the case of continuing the transmission of the video image (YES in S805), the processing unit 12 repeats the processes of steps S802 to S804. If the video transmission is not continued (NO in S805), the processing unit 12 finishes the control process of the image sensing for the video transmission.

In FIG. 9, first, in S901, the processing unit 12 discriminates whether or not the video frames have been stored in the temporary storing unit 13 by the processes in FIG. 8 which are simultaneously executed.

If no video frames are stored in the temporary storing unit 13 (NO in S901), the processing unit 12 continues the process for discriminating whether or not the video frames have been stored in the temporary storing unit.

If the video frames have been stored in the temporary storing unit 13 (YES in S901), the processing unit 12 searches for the video frame which was photographed at the oldest time from the stored video frames (S902). This searching process is executed with reference to image sensing time information added to each video frame.

Subsequently, the processing unit 12 sends the video frame searched in S902 to the communicating unit 14 and allows it to be stored in the temporary storing unit 16 for the communication. The processing unit 12 allows the communicating unit 14 to transmit the video frame stored in the temporary storing unit 16 for the communication to the client apparatus as a transmitting source of the request for the video frame (S903).

When a notification showing the completion of the transmission of the video frame is received from the communicating unit 14 in S903, the processing unit 12 deletes the video frame searched in S902 from the temporary storing unit 13 (S904).

The processing unit 12 discriminates whether or not the transmission of the video image is continued (S905) on the basis of whether or not the request for the termination of the transmission has been received or on the basis of the communicating situation or the like of the video transmission destination.

In the case of continuing the transmission of the video image (YES in S905), the processing unit 12 repeats the processes of steps S901 to S904. If the video transmission is not continued (NO in S905), the processing unit 12 finishes the control process of the image sensing for the video transmission.

As described above, according to the embodiment, the proper video frame can be distributed in response to the request from the client apparatus.

(Second Embodiment)

The second embodiment will now be described.

The second embodiment differs from the first embodiment with respect to the transmitting process of the video frame for recording. Since other constructions and processes are similar to those in the first embodiment, their explanation is omitted here.

Figure 10:
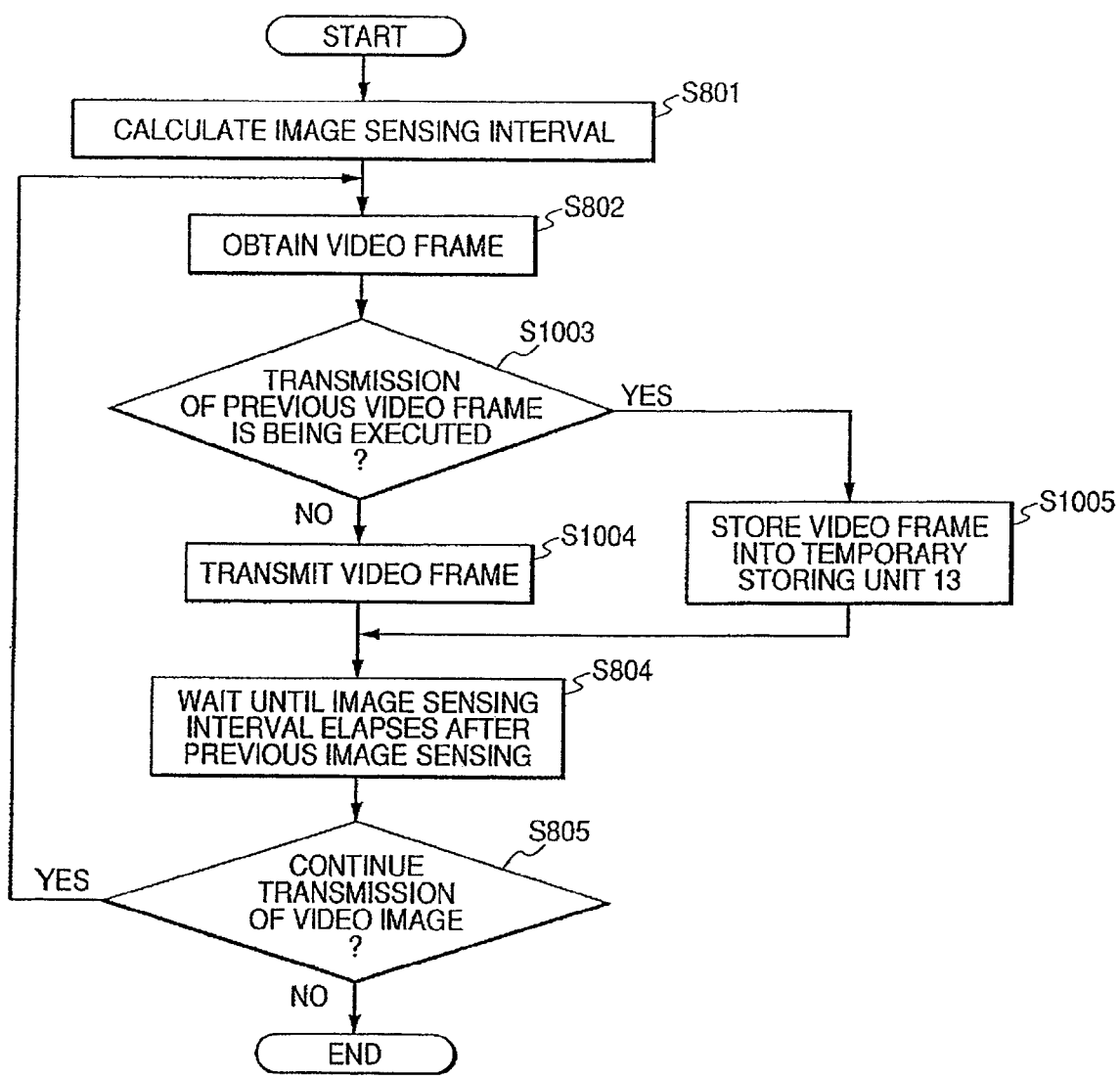
FIG. 10 is a flowchart for a forming/transmitting process of a video frame for recording which is executed by the processing unit 12 in the second embodiment.

FIG. 10 is a flowchart showing the transmitting process of the video frame for recording which is executed by the processing unit 12. In FIG. 10, since the processes of steps S801, S802, S804, and S805 are the same as those in FIG. 8, their explanation is omitted here.

The processing unit 12 obtains information regarding a processing state of the communicating unit 14 from the communicating unit 14. The processing unit 12 discriminates whether or not the communicating unit 14 is executing at present the transmitting process of the video frame in the process of the video transmission for recording on the basis of the information regarding the processing state of the communicating unit 14 (S1003).

If the communicating unit 14 is executing the transmitting process of the video frame in the process of the video transmission for recording (YES in S1003), the processing unit 12 allows the obtained video frame to be stored into the temporary storing unit 13 without transmitting it from the communicating unit 14 (S1005). Namely, if the transmission of the previous video frame has not been completed, the processing unit 12 allows the obtained video frame to be stored in the temporary storing unit 13 without transmitting it from the communicating unit 14.

If the communicating unit 14 is not executing the transmitting process of the video frame in the process of the video transmission for recording (NO in S1003), the processing unit 12 allows the obtained video frame to be stored into the temporary storing unit 16 for the communication of the communicating unit 14. The processing unit 12 allows the communicating unit 14 to transmit the video frame to the client apparatus as a transmitting source of the request (S1004).

In the transmitting method of the video frames for recording in FIG. 10, there is a case where the video frames are not transmitted but are stored into the temporary storing unit 13 in dependence on the communicating state. When a retransmitting request including the information which specifies the video frame such as image sensing time, ID, and the like is received, the video frames stored in the temporary storing unit 13 are transmitted from the network camera apparatus 1.

Figure 11:
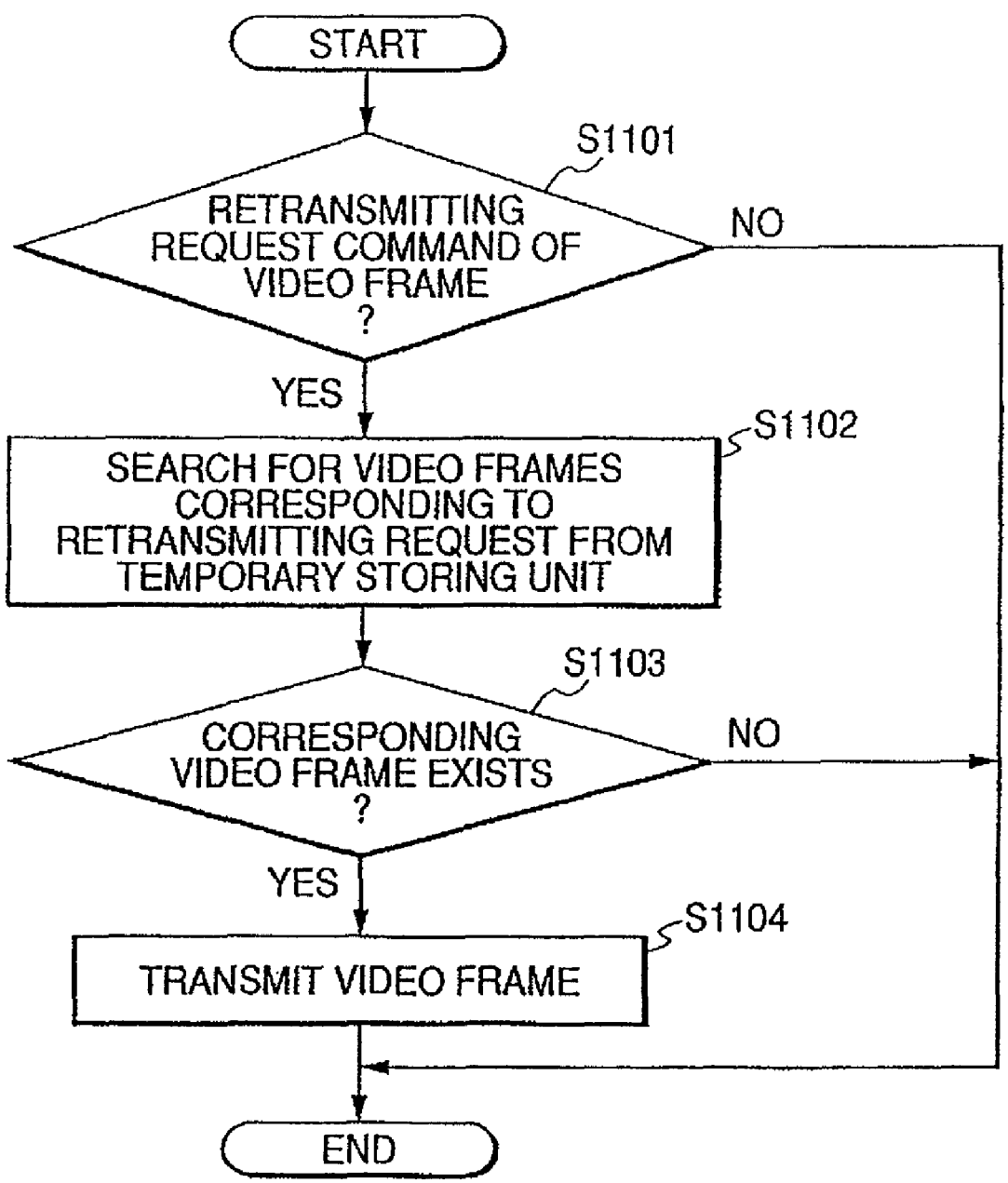
FIG. 11 is a flowchart for a responding process of a retransmitting request which is executed by the processing unit 12 in the second embodiment.

FIG. 11 is a flowchart showing the control process of the transmission of the video frames which is executed by the processing unit 12 in response to the request for retransmitting the video frames stored in the temporary storing unit 13. The operation will be described with reference to FIG. 11.

The processing unit 12 discriminates whether or not the received request is the request for retransmitting the video frames (S1101).

If it is determined that the request is not the retransmitting request (NO in S1101), the retransmitting process by the processing unit 12 is finished. If it is the retransmitting request (YES in S1101), the processing unit 12 searches for the video frame whose time has been designated by the retransmitting request from the video frames stored in the temporary storing unit 13 (S1102).

As a result of the search, the processing unit 12 discriminates whether or not the designated video frame exists in the temporary storing unit 13 (S1103).

If the designated video frame does not exist in the temporary storing unit (NO in S1103), the processing unit 12 notifies the client apparatus which transmitted the retransmitting request of an error and finishes the retransmitting process.

If the designated video frame exists in the temporary storing unit (YES in S1103), the processing unit 12 allows the searched video frame to be stored into the temporary storing unit 16 for the communication in the communicating unit 14. The processing unit 12 allows the communicating unit 14 to transmit the video frame to the transmitting source of the retransmitting request (S1104) and finishes the retransmitting process.

Figure 12:
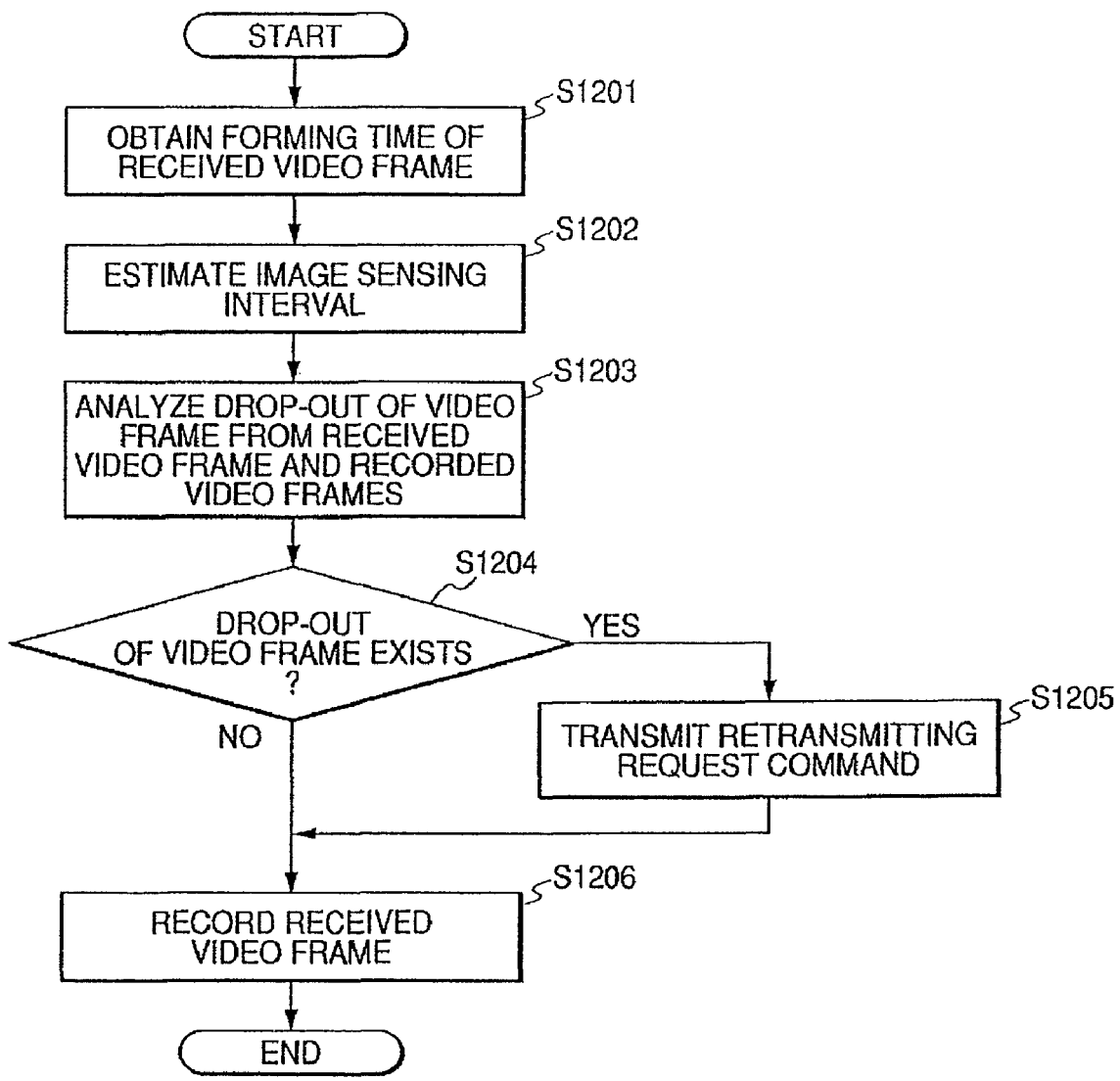
FIG. 12 is a flowchart for a process upon reception of a recording video image which is executed by a recording apparatus 3 in the second embodiment.

FIG. 12 shows a flowchart for an operating process which is executed by the processing unit 33 when the recording apparatus 3 has received the video frame from the network camera apparatus 1.

In the recording apparatus 3, the processing unit 33 obtains the forming time information (image sensing time information of the image sensing unit 11) of the video frame added to the received video frame (S1201).

The processing unit 33 estimates a frame rate (image sensing interval) at the image sensing time obtained in S1201 on the basis of history information of the request for the frame rate stored in the RAM of the processing unit 33 (S1202). The forming time (image sensing time of the image sensing unit 11) of the video frame and a command to designate the frame rate at that time are included in the request for the frame rate which is outputted from the recording apparatus 3.

The processing unit 33 obtains an interval between the received video frame and the video frame just before on the basis of the forming time of the video frame obtained in S1201 and the forming time of the video frame recorded in the video image recording unit 32 just before. The processing unit 33 analyzes whether or not there is a drop-out of the video frames at time positions around the image sensing time of the received video frame on the basis of the obtained interval of the video frames and the image sensing interval estimated in S1202 (S1203).

If the drop-out of the video frames exists (YES in S1204), the processing unit 33 forms the retransmitting request of the portion where the video frames have been dropped out and transmits it to the network camera apparatus 1 (S1205). Information of the forming time (image sensing time of the image sensing unit 11) of the unobtained video frame obtained on the basis of the image sensing interval estimated in S1202 and the forming time of the video frame obtained in S1201 is included in the retransmitting request. The retransmitting request further includes addresses of the recording apparatus 3 and the network camera apparatus.

If the drop-out of the video frames does not exist (NO in S1204), the processing unit 33 records the received video frame into the video image recording unit 32 (S1206).

As described above, when the video frame has been dropped out, since the video frame is retransmitted in response to the request for the video frame for recording, the video frame can be certainly recorded. A possibility that the continuous video frames are accumulated in the temporary storing unit 13 decreases. Consequently, such a situation that the video frames are not recorded for a long period of time does not occur.

In the foregoing embodiment, there is shown a form in which, in the network camera apparatus 1, the processing unit 12 controls the interval (frame rate) of the video frames which are formed by the image sensing unit 11. Further, in the invention, the image sensing unit 11 and other constructions of the network camera apparatus 1 may be functionally separated.

That is, the invention can be also applied to a form in which the processing unit 12 passively processes the video frames distributed at a frame rate (for example, 30 frames/second) which has been preset in the image sensing unit 11 instead of the frame rate set by the processing unit 12. In this case, the transmitting process of the video frame for the live display shown in FIG. 7 is executed as follows.

In S701, the processing unit 12 obtains information on the image sensing interval (video frame forming interval) from the image sensing unit 11, instead of calculating the interval. This information is used in S704. In S702, the processing unit 12 stores the video frame obtained in each interval from the image sensing unit 11 in the temporary storing unit 13. The video frame stored in the temporary storing unit 13 is updated each time a new video frame is obtained from the image sensing unit 11. Namely, the temporary storing unit 13 always stores the latest video frame. In S703, the processing unit 12 transmits the latest video frame stored in the temporary storing unit 13 to the communicating unit 14. On the other hand, in the transmitting process of the video frame for recording shown in FIG. 8, the processing unit 12 obtains information on the image sensing interval (video frame forming interval) from the image sensing unit 11 in S801, instead of calculating the interval. This information is used in S704.

This application claims priority from Japanese Patent Application No. 2006-173623 filed on Jun. 23, 2006, which is hereby incorporated by reference herein.

What is claimed is:

1. A network camera apparatus for transmitting video frames formed in an image sensing unit to a client apparatus, the network camera apparatus comprising:
   a communication unit configured to communicate with the client apparatus;
   acquiring means for acquiring a time interval related to the video frames formed in the image sensing unit;
   determining means for determining a type of a video frame request from the client apparatus; and a control unit configured to (a) in a case where the determining means determines that the video frame request is for a live display and the transmission of a last video frame formed at a first timing is not completed by a second timing later than the first timing by the time interval, control transmitting of a video frame such that a video frame formed at the second timing is not transmitted to the client apparatus and (b) in a case where the determining means determines that the video frame request is for recording and the transmission of the last video frame formed at the first timing is not completed by the second timing, memorize in a memory the video frame formed at the second timing such that the video frame formed at the second timing can be transmitted to the client apparatus at a timing later than a transmission timing corresponding to the second timing.

2. The network camera apparatus according to claim 1, wherein the control unit transmits the video frame formed at the second timing and stored in the memory in response to a request from the client apparatus at the timing later than the transmission timing.

3. The network camera apparatus according to claim 2, wherein when a plurality of video frames are memorized in the memory, the plurality of memorized video frames are not transmitted because the transmission of a previous video frame has been delayed more than a predetermined time interval based on the acquired time interval, and the control unit transmits the plurality of memorized video frames in response to the request from the client apparatus at the timing later than the transmission timing.

4. A video frame transmitting method of a network camera apparatus for transmitting video frames formed in an image sensing unit to a client apparatus, the method comprising: (a) acquiring a time interval related to the video frames formed in the image sensing unit; (b) determining a type of a video frame request from the client apparatus; (c) in a case where it is determined that the video frame request is for live display and the transmission of a last video frame formed at a first timing is not completed by a second timing later than the first timing by the time interval, controlling transmitting of a video frame such that a video frame formed at the second timing is not transmitted to the client apparatus; and (d) in a case where it is determined that the video frame request is for recording and the transmission of the last video frame formed at the first timing is not completed by the second timing, memorizing in a memory the video flame formed at the second timing such that the video flame formed at the second timing can be transmitted to the client apparatus at a timing later than a transmission timing corresponding to the second timing.

5. The method according to claim 4, wherein the video frame formed at the second timing and stored in the memory is transmitted in response to a request from the client apparatus at the timing later than the transmission timing.

6. The method according to claim 5, wherein when a plurality of video frames are memorized in the memory, the plurality of memorized video frames are not transmitted because the transmission of a previous video frame has been delayed more than a predetermined time interval based on the acquired time interval, and the plurality of memorized video frames are transmitted in response to the request from the client apparatus at the timing later than the transmission timing.

7. A non-transitory computer-readable storage medium which stores a computer program for allowing a computer to execute the method according to claim 4.

* * * * *